US005379219A

United States Patent [19]

Ishibashi

[11] Patent Number: 5,379,219

[45] Date of Patent: Jan. 3, 1995

[54] VEHICLE DIGITAL MOVEMENT DATA RECORDING APPARATUS

[75] Inventor: Wataru Ishibashi, Shizuoka, Japan

[73] Assignee: Yazaki Corporation, Tokyo, Japan

[21] Appl. No.: 220,628

[22] Filed: Mar. 30, 1994

Related U.S. Application Data

[63] Continuation of Ser. No. 696,645, May 7, 1991, abandoned.

[30] Foreign Application Priority Data

Jun. 12, 1990 [JP] Japan .................................... 2-61354

[51] Int. Cl.[6] .......................... G06F 13/00; G06F 7/70

[52] U.S. Cl. .......................... 364/424.04; 364/424.03; 364/424.01; 340/438; 340/459

[58] Field of Search .............. 364/424.04, 550, 424.03, 364/431.01, 436, 442, 551.01, 424.01, 561; 340/438, 439, 441, 459, 425.5, 428

[56] References Cited

U.S. PATENT DOCUMENTS

| | | | |
|---|---|---|---|
| 4,067,061 | 1/1978 | Juhasz | 364/424.04 |
| 4,072,850 | 2/1978 | McGlynn | 364/424.04 |
| 4,258,421 | 3/1981 | Juhasz et al. | 364/424.04 |
| 4,853,859 | 8/1989 | Morita et al. | 364/424.04 |
| 4,866,616 | 9/1989 | Takeuchi et al. | 364/424.04 |
| 4,885,691 | 12/1989 | Ishii et al. | 364/424.04 |
| 4,939,652 | 7/1990 | Steiner | 364/424.04 |
| 5,012,414 | 4/1991 | Ishii et al. | 364/424.03 |
| 5,046,007 | 9/1991 | McCrery et al. | 364/424.04 |
| 5,173,856 | 12/1992 | Purnell et al. | 364/424.04 |
| 5,191,529 | 3/1993 | Ramsey et al. | 364/424.04 |
| 5,218,543 | 6/1993 | Komatsu | 364/424.04 |
| 5,249,127 | 9/1993 | Komatsu | 364/424.04 |

FOREIGN PATENT DOCUMENTS 3839221 2/1990 Germany .

*Primary Examiner*—Thomas G. Black
*Assistant Examiner*—Jacques Harold Louis-Jacques
*Attorney, Agent, or Firm*—Nikaido, Marmelstein, Murray & Oram

[57] ABSTRACT

The main purpose of a vehicle digital movement data recording apparatus according to the present invention is to cope with a shortage of the memory space in the digital movement data recording area of an external record medium. For completing this objective, the recording apparatus, includes a digital movement data generating device for supervising the moving state of the vehicle and producing the digital movement data thereof. A storage device records the digital movement data produced by the digital movement data generating device onto a digital movement data recording area of an external record medium which can be loaded into and unloaded from the recording apparatus. A detecting device detects the situation that there is no more available space for recording the digital movement data the data recording area of the external record medium. When the detecting device detects that there is no available space for recording the movement data in the digital movement data recording area of the external record medium, the storage device records such data as travel starting time, terminating time and a travel distance of the vehicle of each vehicle movement in a memory shortage compensation area provide in an optional recording area of the external record medium.

4 Claims, 4 Drawing Sheets

VEHICLE DIGITAL MOVEMENT DATA RECORDING APPARATUS

This application is a continuation of application Ser. No. 07/696,645 filed May 7, 1991 now abandoned.

BACKGROUND OF THE INVENTION

1. Field of the Invention

This invention relates to a digital movement data recording apparatus for recording vehicle movement data indicating moving conditions of a vehicle such as speed and travel distance onto an external record medium.

2. Description of the Prior Art

Vehicle movement data recording apparatuses of the type mentioned above are carried on a vehicle for first monitoring the moving state of the vehicle to produce digital movement data indicating moving conditions of the vehicle, and then compressing the above digital movement data in accordance with a predetermined set value so as to finally record the thus compressed digital movement data onto an external record medium. The external record medium is made of an IC (Integrated Circuit) memory card and so forth which can be loaded into and unloaded from the recording apparatus, and the data recorded on the external record medium is read out by an analyzing apparatus installed at an office for the supervision of movements of vehicles from such record medium and expanding and analyzing the thus read digital movement data.

More specifically, the digital movement data recording apparatus comprises a CPU (micro-computer) for sampling and receiving electric signals from a rotation sensor which is connected to a transmission mechanism of the vehicle, by way of a suitable connecting means, and determining an instantaneous speed and a travel distance of the vehicle by calculation in accordance with the thus received electric signals and executing various jobs including compression of data in preparation for recording of the speed data and travel distance obtained by the calculation as digital data onto an external record medium.

The above described vehicle movement data digitally recorded in an external record medium is excellently effective for supervision of the moving state of the vehicle.

However, with the conventional recording apparatus described above, since recording capacity of the external record medium is limited, the recording capacity runs short in accordance with the normal recording operation of the digital movement data, and as a matter of fact there will be an occasion that there is no recording space left in the record medium for recording the movement data and that no further data can be recorded after the point where the recording capacity has run out, with the result that one can not attain the complete recorded data. The same thing can happen when an external record medium with no recording space is loaded into the recording apparatus, in which case there will be absolutely no recorded data left.

SUMMARY OF THE INVENTION

It is an object of the present invention to provide a digital movement data recording apparatus which can avoid the situation that no digital movement data is recorded onto the external medium due to a shortage of the recording capacity of the external record medium.

In order to attain the objectives, there is provided a digital movement data recording apparatus, as shown in FIG. 1, which comprises a vehicle movement data generating means 11a for supervising the moving state of the vehicle and producing the digital movement data thereof, a storage means 11b for recording the digital movement data produced by the digital movement data generating means 11a onto a digital movement data recording area 15a2 of an external record medium 15 which can be loaded into and unloaded from the recording apparatus and a detecting means 11c for detecting the situation that there is no more available space for recording the digital movement data in the data recording area 15a2 of the external record medium, wherein when the detecting means detects that there is no vacancy for recording the movement data in the digital movement data recording area of the external record medium, the storage means 11b records such data as travel starting time, terminating time and a travel distance of the vehicle of each movement in the optional recording area 15a3 of the external record medium.

As shown, in FIG. 1, the external record medium 15 includes an optional recording area 15a3, wherein when there is no recordable space left in the digital movement data recording area 15a2, the data such as travel starting time, terminating time and a travel distance of each one movement of the vehicle are recorded in the optional recording area, and subsequently, even when there is no available space left for recording digital movement data in the external record medium 15, a minimum necessary data can still be obtained, avoiding the occurrence of the state that there is no digital data recorded in the external record medium 15 due to a shortage of the recording capacity thereof.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
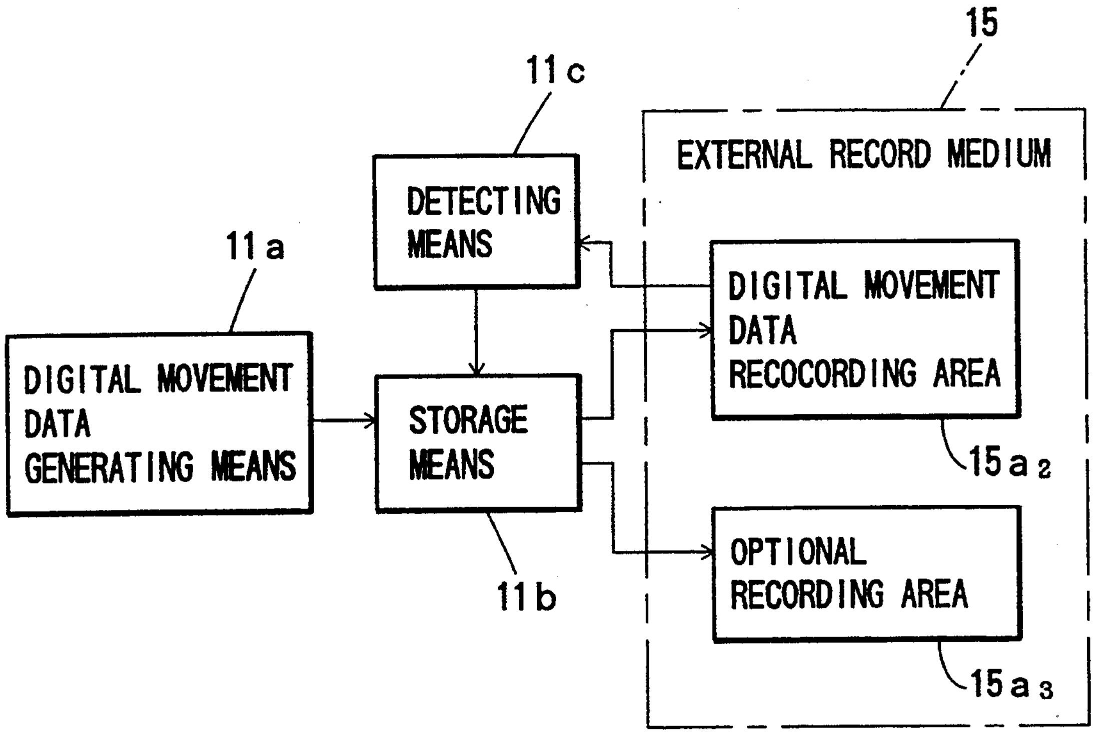
FIG. 1 is a block diagram showing basic construction of a digital movement data recording apparatus according to the present invention.
Figure 2:
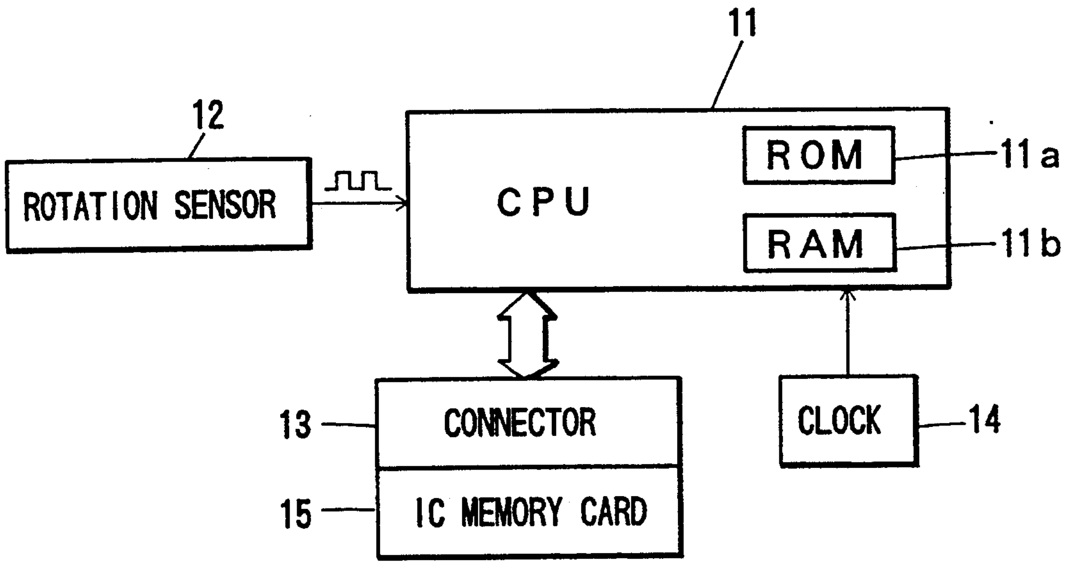
FIG. 2 is a block diagram of a vehicle movement data recording apparatus showing one preferred embodiment of the present invention.

Referring to FIG. 2, there is shown one preferred embodiment of a vehicle movement data recording apparatus according to the present invention. The digital movement data recording apparatus includes a CPU (micro-computer) 11 which operates in accordance with a preset program. The CPU 11 comprises a ROM 11a (read-only memory) having a control program for regulating the operation thereof, and a RAM 11b (random access memory) for recording various data formed during the data processing operation of the CPU 11. The CPU 11 is connected to a rotation sensor 12, a connector 13 and a clock 14 to measure real time, and the connector 13 is removably connected to an IC memory card 15 used as an external record medium which can be loaded into or unloaded from the connector.

The rotation sensor 12 is connected to a transmission mechanism of the vehicle by a suitable connecting means (no shown), and generates electric pulse signals in accordance with the speed of the vehicle, which signals are further supplied to the CPU 11.

The CPU 11 samples and receives the electric signals generated from a rotation of the sensor 12 to thereby produce digital movement data comprising an instantaneous speed and a travel distance of the vehicle by calculation in accordance with the thus received electric signals, and record the thus produced data into an IC memory card 15 used as an external record medium through data compressing processing. In the above occasion, when the IC memory card 15 is loaded into the recording apparatus and connected to the connector 13, the various data recorded in the IC memory card 15 are read out, and/or the compressed digital movement data and so on are written into the IC memory card 15.

The clock 14 connected to the CPU 11 forms and outputs time information including data of a year, a month, a day, an hour and a minute, which are incremented at predetermined time intervals.

Figure 3:
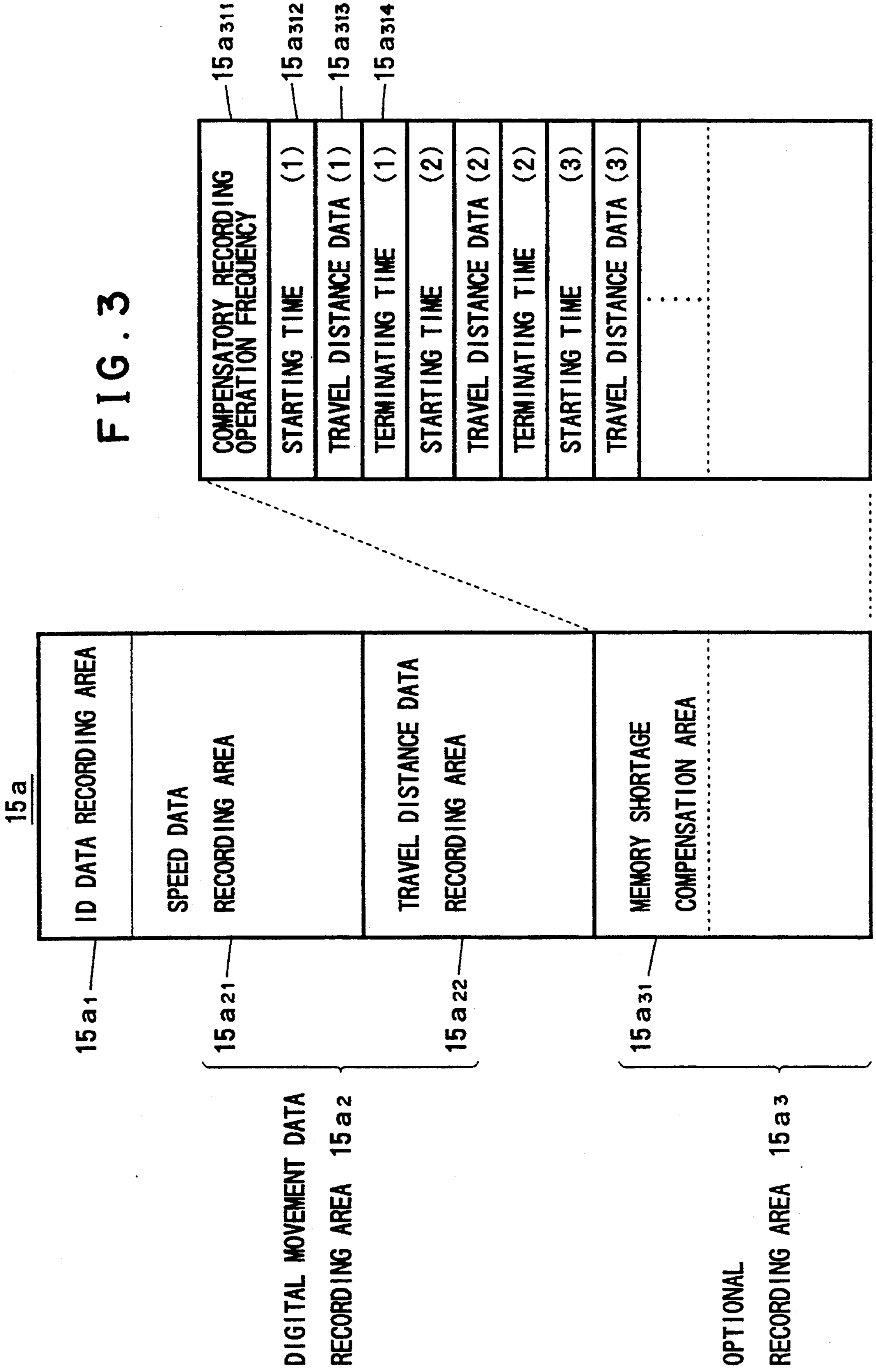
FIG. 3 is a schematic illustration showing record areas of an IC memory card as an external record medium for use with the recording apparatus shown in FIG. 2.

The IC memory card 15 includes a memory 15*a* in which one word is structured of eight bits (one byte) as shown in FIG. 3. In the memory 15*a*, there are formed an ID data recording area 15*a*1 for recording ID data, a digital movement data recording area 15*a*2 for recording such data as speed and travel distance and an optional recording area 15*a*3.

In the ID data recording area 15*a*1, the data such as speed sampling time, speed allowance, movement starting time, movement terminating time, speed record terminating address and travel distance record terminating address and so on are recorded.

On the other hand, the digital movement data recording area 15*a*2 is partitioned into a speed data recording area 15*a*21 and a travel distance recording area 15*a*22 respectively for recording speed and travel distance of each movement. In the optional recording are 15*a*3, there is provided a memory shortage compensation area 15*a*31 to cope with a shortage of the available recording space in the digital movement data recording area 15*a*2, which compensation area 15*a*31 is further partitioned into such areas as 15*a*311 for recording the number incremented in accordance with the compensatory recording operation of each movement of the vehicle after recording capacity of the digital movement data recording area 15*a*2 is reduced to a stage less than a predetermined value, and other areas 15*a*312 to 15*a*314 respectively recording a starting time, travel distance and terminating time of each movement.

The allowance for the speed data recorded in the above ID data recording area 15*a* represents the error range allowed at the time of recording, which allowance is related to precision of the speed data simultaneously collected with the sampling time, so that the precision of the data obtained by the compression processing depends on the allowance and sampling time, and these data are absolutely essential for data expansion and analysis on the analyzing side. Further, time data comprising the starting time and terminating time respectively recorded at the start and the end of each movement are important when analysis is made with the digital movement data distributed over the period between the starting time and the terminating time thereby to find out the state of speed at each point of time in-between.

One movement is defined, for example, as the time interval between the loading of the IC memory card into the digital movement data recording apparatus and the removing of the same from the recording apparatus.

The CPU 11 inputs electric pulse signals generated from the rotation sensor 12 in accordance with the movement of the vehicle and calculates the number of pulse signals, and then determine the speed of the vehicle from a difference of the number of pulse signals between predetermined sampling times stored in the RAM 11 so as to produce digital speed data based on the thus calculated speed. Where after, the CPU 11 determines whether or not there is enough recording capacity in the digital movement data recording area 15*a*2 of the Ic memory card, and when there is still more capacity than that of a predetermined level, the CPU 11 compresses the thus produced digital speed data in accordance with the speed allowance which is stored in a predetermined area of the RAM 11 and then records it in the speed data recording area 15*a*21 of the IC memory card. Further, the CPU determines a digital travel distance data by supervising whether a predetermined distance has been traveled at each predetermined interval, and then compresses the thus determined data and records it in the travel distance recording area 15*a*22 of the IC memory card 15. Still further, in the recording operation of the digital movement data, if the above data are the first data of the starting time and the last data of the terminating time of each movement, the CPU 11 records respective time data issued by a clock 14 into the ID data recording area 15*a*1. Then, when the CPU determines that the capacity of the digital movement data recording area 15*a*2 of the IC memory card 15 is running short, and finally has come to the stage less than a predetermined value, then it starts recording a starting time, travel distance and a terminating time, and also the number of recording operations incremented by each movement in the memory shortage compensation area 15*a*31 in the optional recording area 15*a*3.

Compression processing of an instantaneous speed in the vehicle digital data recording apparatus is executed based on the following idea. In particular, if a tolerance or allowance to be allowed for each sampled speed value is set in advance and a straight line intersecting the allowance is considered, then the straight line represents vehicle speed information within the allowance. Then, if the length of the straight line is represented by and recorded in a sampling number or number of samples and a value of a last end of the straight line is also recorded, then the vehicle speed for a period of time covered by the straight line can be supervised periodically. If the vehicle speed is stored only in length of the straight line and last point data in this manner, then much information can be stored in a small amount of data, and accordingly, compression of data is realized.

Figure 4:
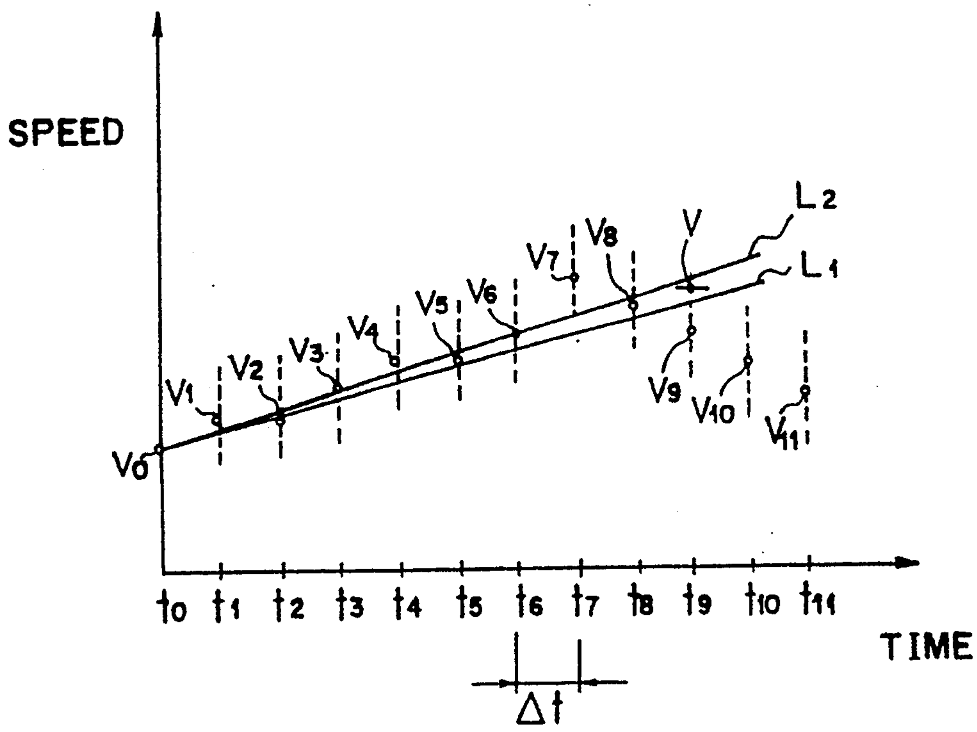
FIG. 4 is a diagram illustrating a manner of compression of digital speed data.

FIG. 4 illustrates a relationship among vehicle speeds V0 to V11 at sampling points of time t0 to t11, and each of broken lines in FIG. 4 represents an allowance of a vehicle speed.

It is examined whether or not there exists, at each sampling point of time, a straight line which intersects the allowance of data at any preceding sampling point of time. While such straight line exists at the sampling points of time t0 to t9, no such straight line exists at the sampling point of time t10. In this instance, among various straight lines which include the starting point V0 and intersect an allowance, a straight line L2 passing an upper limit and another straight line L1 passing a lower limit are drawn, and a middle point V of that range of the allowance for the last sampling data V9 which is defined by the straight lines L1 and L2 is determined as data of the last point and the length is determined to be "9". The last point is determined as a starting point of a next straight line, and similar operation is performed successively after then. By such compression processing as described above, compressed speed data are recorded in a sampling number and a speed into the IC memory card 15.

The IC memory card 15 into which digital vehicle movement data have been recorded by the recording apparatus is unloaded from the recording apparatus, and then loaded into the analyzing apparatus not shown in order to make an analysis of the digital movement data stored in the IC memory card 15.

Figure 5:
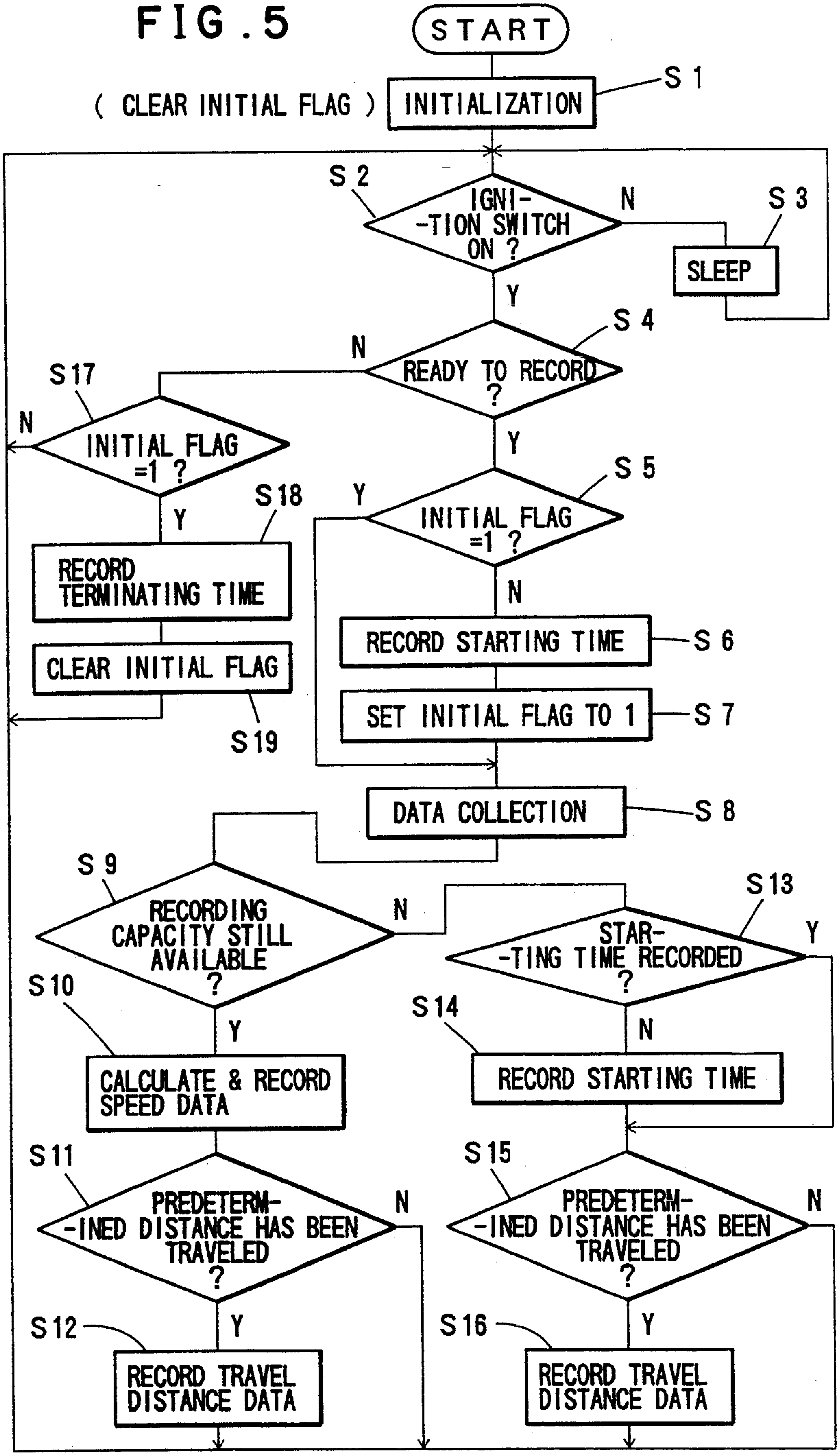
FIG. 5 is a flow chart illustrating operation of the CPU mounted in the digital movement data recording apparatus of FIG. 2.

Referring now to FIG. 5, there is shown a flow chart illustrating operation of the digital movement data recording apparatus to be executed in accordance with a control program.

The CPU 11 of the digital movement data recording apparatus starts its operation when power is made available and first at step S1, the CPU 11 executes its initialization to clear the initial flag, that is, to set the flag to "0", which flag is assigned to a predetermined area in the RAM 11*b* of the CPU 11. Subsequently, the control sequence advances to step S2 at which the CPU 11 determines in accordance with a signal from an ignition detecting circuit (no shown) of the vehicle whether or not an ignition switch (not shown) of the vehicle is switched on. If the ignition switch is off, then the CPU 11 puts itself into a sleeping condition at step S3, and then the control sequence returns to step S2 so as to determine whether or not the ignition switch is switched on. Then after the determination of YES is obtained at step S2, the control sequence advances from step S2 to step S4. At step S4, it is to be determined whether or not an IC memory card 15 is loaded in a state that the recording is possible and that it is ready to record. Then, if the determination at step S4 is YES, the control sequence advances to step S5 at which it is determined whether or not the initial flag is equal to "1". In case the determination at step S5 is NO, the control sequence advances to step S6 at which the time data received from a clock 14 is recorded into the ID data recording area 15*a*1 as a vehicle movement starting time, and then to step S7 at which the initial flag is set to "1".

After then, the control sequence advances to step S8 at which data are collected, and then further advances to step S9. At step S9, it is determined whether or not there is still recording capacity in the digital movement data recording area 15*a*2 of the IC memory card 15, and if there is still recording capacity of more than a predetermined level, then the control sequence advances to step S10 at which a speed data is determined by calculation and the thus determined speed data is recorded in the speed data recording area 15*a*21. Then the control sequence advances to step S11, at which it is determined whether or not the vehicle has traveled a predetermined distance, and if the determination here is YES, then the control sequence advances to step S12 at which the detected travel distance data is recorded in the travel distance data recording area 15*a*22 of the IC memory card 15, the recording of this travel distance data is executed by incrementing each byte of the IC memory card 15, and then the control sequence returns to step S2. If the determination at step S11 is NO, then the control sequence directly returns to step S2 without executing the processing operation of step S12.

In the above case, when the initial flag is set to "1" in step S7, the determination at step S5 thereafter becomes YES, so that after execution of step S5 the control sequence advances directly to step S8 without executing operations at step S6 and step S7.

If, as a result of the determination at step S9, it is determined that there is not enough recording capacity in the digital movement data recording area 15*a*2 of the IC memory card 15, the control sequence advances to step S13 at which it is determined whether or not a starting time of the present movement is recorded in the memory shortage compensation area 15*a*31 of the optional recording area 15*a*3. Then if the result of the determination at step S13 is NO, the control sequence advances to step S14 at which the time data of the clock 14 is recorded in the memory shortage compensation area 15*a*31 of the optional recording area 15*a*3 as a starting time, and simultaneously the number of recording operation in the memory shortage compensation area 15*a*31 is incremented, and then the control sequence advances to step S15 at which it is determined whether or not the vehicle has traveled a predetermined distance, and if the determination here is YES, then it returns to step S2 after recording travel distance data at step S16. If the determination is NO, then the control sequence returns to step S2 jumping off step S16.

If the determination at step S4 is NO, in other words, in case the IC memory card 15 is not ready to record, the control sequence advances to step S17 at which it is determined whether or not the initial flag is equal to "1", and if the determination here is NO, the control sequence returns to step S2. On the contrary, if the determination at step S17 is YES, then the control sequence advances to step S18 at which the time data from the clock 14 is recorded in the ID data recording area 15*a*1 or in the optional recording area 15*a*3, and then advances to step S19 at which the initial flag is set to "0" to finally return to step S2.

As described above, in accordance with the flow chart in FIG. 5, even when there is no recording capacity left in the digital movement data recording area in which speed data and travel distance data are to be recorded, a travel distance, a starting time and terminating time of each movement are recorded in the optional recording area 15*a*3, it is much more convenient from the vehicle movement managing point of view than prior recording apparatuses in which there will be no data recorded if there is no recording capacity left in the data recording area.

As all described above, since the recording apparatus according to the present invention comprises an optional recording area in an external record medium, and record a travel distance, a starting time and terminating time of each movement in case there is no recording capacity in the digital movement data recording area thereof, a driver can always obtain minimum information even when there is no recording capacity in the digital movement data recording area of the external record medium, hampering the occurrence of the situation that there is no digital data recorded due to a shortage of the recording capacity of the external record medium.

Having now fully described the invention, it will be apparent to one of ordinary skill in the art that many changes and modifications can be made thereto without departing from the spirit and scope of the invention as set forth herein.

What is claimed is:

1. A vehicle digital movement data recording apparatus comprising:

an external record medium having a digital movement data recording area for recording compressed data and an optional recording area for recording further data having a resolution lower than said compressed data when said digital movement data recording area has no more space available for recording data;

a digital movement data generating means for supervising a moving state of a vehicle and for producing digital movement data thereof;

a storage means for recording said digital movement data produced by said digital movement data generating means onto said digital movement data recording area of said external record medium, said external record medium adapted to be inserted into and removed from said recording apparatus; and a detecting means for detecting when there is no more available space for recording said digital movement data in said digital movement data recording area of said external record medium, wherein when said detecting means detects that there is no available space for recording said digital movement data in said digital movement data recording area of said external record medium, said storage means records data such as travel starting time, terminating time and a travel distance of said vehicle of each vehicle in a memory storage compensation area provided in said optional recording area of said external record medium.

2. A vehicle digital movement data recording apparatus as claimed in claim 1, wherein said each vehicle movement is further defined as a time interval between insertion of said external record medium into said digital movement data recording apparatus and removal of said external record medium from said recording apparatus.

3. A vehicle digital movement data recording apparatus as claimed in claim 2, wherein said external record medium is made of an IC memory card.

4. A vehicle digital movement data recording apparatus as claimed in claim 1, wherein said external record medium is made of an IC memory card.

* * * * *